US00RE42632E

(19) United States
(12) Reissued Patent
Heflin

(10) Patent Number: US RE42,632 E
(45) Date of Reissued Patent: Aug. 23, 2011

(54) RECESSED WATER FAUCET

(75) Inventor: Danny Heflin, Decatur, MS (US)

(73) Assignee: M & H Waterworks, L.L.C., Decatur, MI (US)

(21) Appl. No.: 11/212,138

(22) Filed: Aug. 25, 2005

Related U.S. Patent Documents

Reissue of:
(64) Patent No.: 6,712,089
Issued: Mar. 30, 2004
Appl. No.: 10/434,227
Filed: May 9, 2003

(51) Int. Cl.
*F16K 35/00* (2006.01)

(52) U.S. Cl. ..... 137/382; 137/307; 137/375; 137/377; 137/236.1; 137/615

(58) Field of Classification Search ..... 137/382, 137/377, 615, 301, 307, 375, 302, 236.1
See application file for complete search history.

(56) References Cited

U.S. PATENT DOCUMENTS

| | | | |
|---|---|---|---|
| 2,214,781 | A | 9/1940 | Cornell |
| 2,513,104 | A | 6/1950 | Payne |
| 5,210,886 | A | 5/1993 | Coe, III |
| 5,614,119 | A | 3/1997 | Ollis |
| 5,740,831 | A | 4/1998 | DeNardo et al. |
| 5,964,246 | A | 10/1999 | Meeker |
| 6,116,265 | A | 9/2000 | Drake |
| 6,293,301 | B1 | 9/2001 | Griffin et al. |
| 6,425,149 | B1 | 7/2002 | Wang |
| 2002/0132369 | A1 | 9/2002 | Wilkinson et al. |

FOREIGN PATENT DOCUMENTS

| | | |
|---|---|---|
| JP | 9095986 | 4/1997 |
| JP | 10131282 | 5/1998 |
| JP | 10176350 | 6/1998 |

*Primary Examiner* — John Fox
(74) *Attorney, Agent, or Firm* — Garvey, Smith, Nehrbass & North, L.L.C.; Charles C. Garvey, Jr.; Seth M. Nehrbass

(57) ABSTRACT

A recessed, frostproof water faucet having a tubular stem connected to a pivot plumbing unit connected to a subsurface water line through the rear wall of a box-like recess unit. A slider connector connects the water faucet tubular stem and the access panel or lid of the recess unit. The lid pivots on hinges and as one lifts the lid, the faucet is lifted by the slider connector from a horizontal storage position to a vertical locked position for use, the slider connector being connected to a faucet flange and sliding along grooves in tracks mounted along the inner side of the lid. A sliding hinge locks the lid upright, sliding downward along the upper end of the rear wall. The faucet is returned to the storage position by pulling upward and lowering to the closed position, the slider connector sliding forward along the grooves to the stored position.

47 Claims, 10 Drawing Sheets

RECESSED WATER FAUCET

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to frostproof faucets. More particularly, the present invention relates to an outdoor frostproof faucet having a covered recess.

2. Description of the Related Art

The most enduring problem with outdoor water faucets such as for providing water to garden hoses is their susceptibility to freezing and bursting during winter months. It is common to provide a faucet having a long stem and a handle turning a long, central rod which actuates the valve. Such faucets are commonly provided horizontally through the wall of a house. They are unsightly and subject to freezing if the house is not kept above freezing temperatures. Such installations may also require a long hose to reach remote areas in a lawn or garden. Such installations, to help hide the faucet behind shrubbery, are generally low to the ground, requiring painful and ungainly bending and twisting motions to install and remove a hose from such a faucet. Vertically extending faucets may retain water in the stem, even if a below-ground, insulated or heated valve is employed, the retained water being subject to freezing, thus damaging the valve. It would be desirable to provide an outdoor type or frostproof water faucet which is recessed in the ground for frost protection when not in use, but is easily rotated upward for use, the storage position being horizontal to allow draining of retained water in the stem. It would further be desirable to provide such a recess system with a cover which may be pivoted upward along with the pivoting faucet and stem and held in a fixed position during use for easy, convenient use in remote locations attached to underground water supply pipes.

Japanese Patent No. 10-176350, published, Jun. 30, 1998, describes an outdoor water closet wherein a faucet component is recessed in a locked closet component accessible only by key and pivots outwardly to allow access when the closet is opened.

Japanese Patent Nos. 9-095986, published Apr. 8, 1997, and 10-1312828, published May 19, 1998, each describe a faucet recessed beneath the surface of a step. The '986 patent further describes affixing the faucet head to the underside of the access step surface, thereby raising and lowering the faucet head when the access step surface is raised and lowered.

U.S. Pat. No. 5,2210,886, issued May 18, 1993, and U.S. Patent Application Publication No. 2002/0132369 A1, published Sep. 19, 2002 each describe the use of pivotable faucets to direct the flow of fluids.

U.S. Pat. No. 6,116,265, issued Sep. 12, 2000, describes a frost proof hydrant system where the removal of the faucet and exposed pipe is removable during winter months, automatically shutting a below-ground valve upon removal of the exposed pipe.

U.S. Pat. No. 6,425,149, issued Jul. 30, 2002, to Wang, T. H., describes swivel plumbing elements.

None of the above inventions and patents, taken either singly or in combination, is seen to describe the instant invention as claimed. Thus a recessed water faucet solving the aforementioned problems is desired.

SUMMARY OF THE INVENTION

The recessed water faucet of the present invention is a recessed, frostproof water faucet having a tubular stem connected to a pivot plumbing unit which is connected to a subsurface water line through the rear wall of a box-like recess unit. The recess unit has a slider connector, connected between the tubular stem of the water faucet and the access panel or lid of the recess unit, which pivots on hinges at the top of the rear wall of thereof. As one lifts the lid, the faucet is lifted by the slider connector from a horizontal storage position to a vertical locked position for use, the slider connector being connected to a faucet flange and sliding along grooves in tracks mounted along the inner side of the lid.

A sliding hinge is employed for locking the lid in an upright position sliding downward relative to and against the upper end of the rear wall. The recessed water faucet is returned to the storage position by unlocking the lid by pulling it upward relative to the rear wall and lowering the lid to the closed position, the slider connector sliding forward along the grooves to the stored position. The box-like receiver may be insulated along its walls, base, and top as desired to protect from freezing in cold climates. The water faucet stem automatically drains by gravity upon closure of the faucet and the lowering of the faucet and lid to the closed, stored position.

Accordingly, it is a principal object of the invention to provide a recessed frostproof water faucet system which protects from freeze damage thereto during the winter months.

It is another object of the invention to provide a recessed frostproof water faucet system as above, having a pivotable stem for rotation of the stem from a horizontal, stored position to a vertical, easily reached, faucet position for normal use.

It is a further object of the invention to provide a recessed system as above having a lid which, upon opening, pivots the faucet and stem to the vertical position for use.

Still another object of the invention is to provide a recessed system as above wherein the lid and water faucet and stem is lockable in the vertical open position for ease in use.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a recessed, frostproof water faucet having a tubular stem connected to a pivot plumbing unit which is connected to a subsurface water line through the rear wall of a box-like recess unit. The recess unit has a slider connector, connected between the tubular stem of the water faucet and the access panel or lid of the recess unit, which pivots on hinges at the top of the rear wall of thereof. As one lifts the lid, the faucet is lifted by the slider connector from a horizontal storage position to a vertical locked position for use, the slider connector being connected to a faucet flange and sliding along grooves in tracks mounted along the inner side of the lid.

Figure 1:
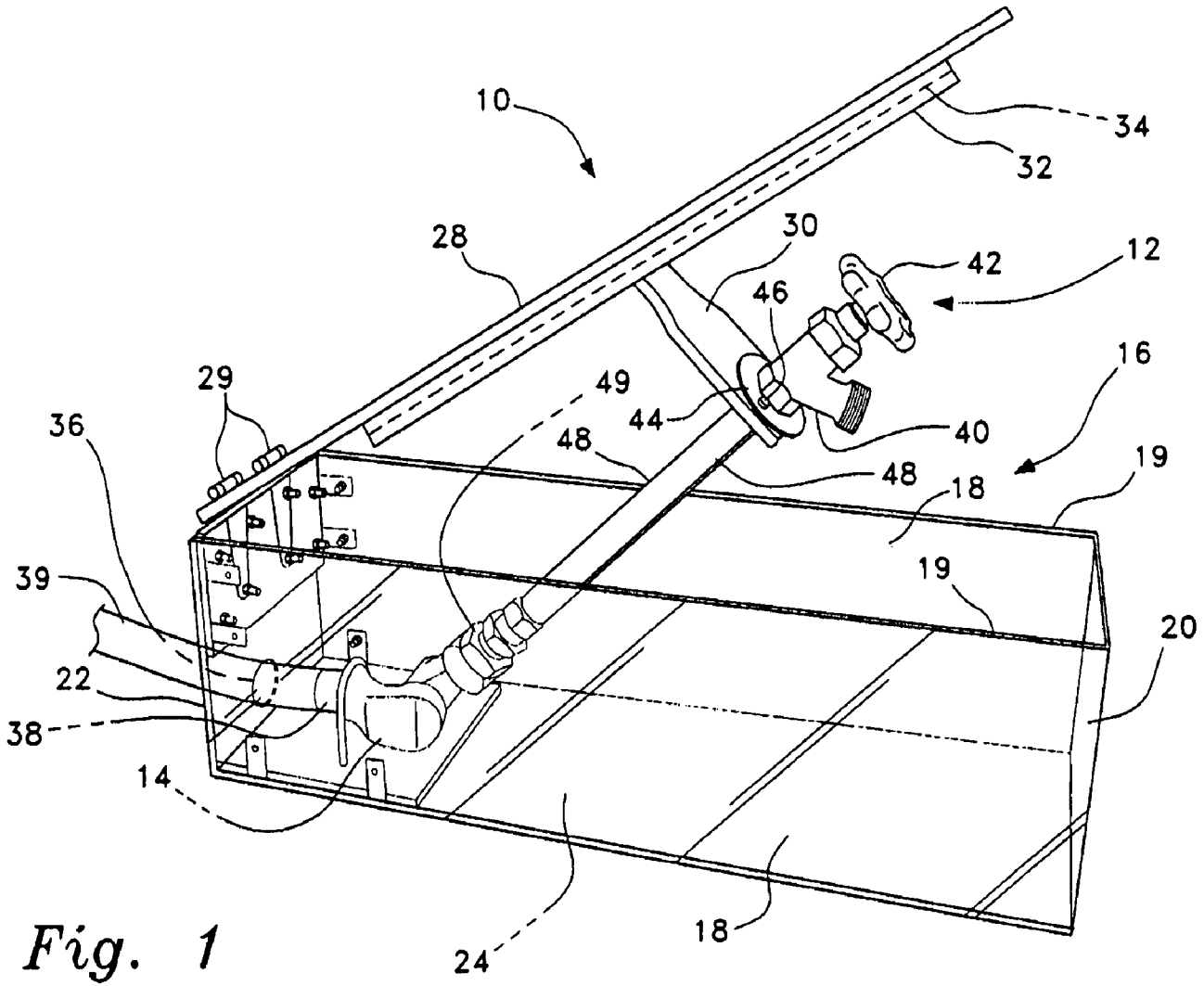
FIG. 1 is a perspective view of a partially opened recessed water faucet according to the present invention.
Figure 2:
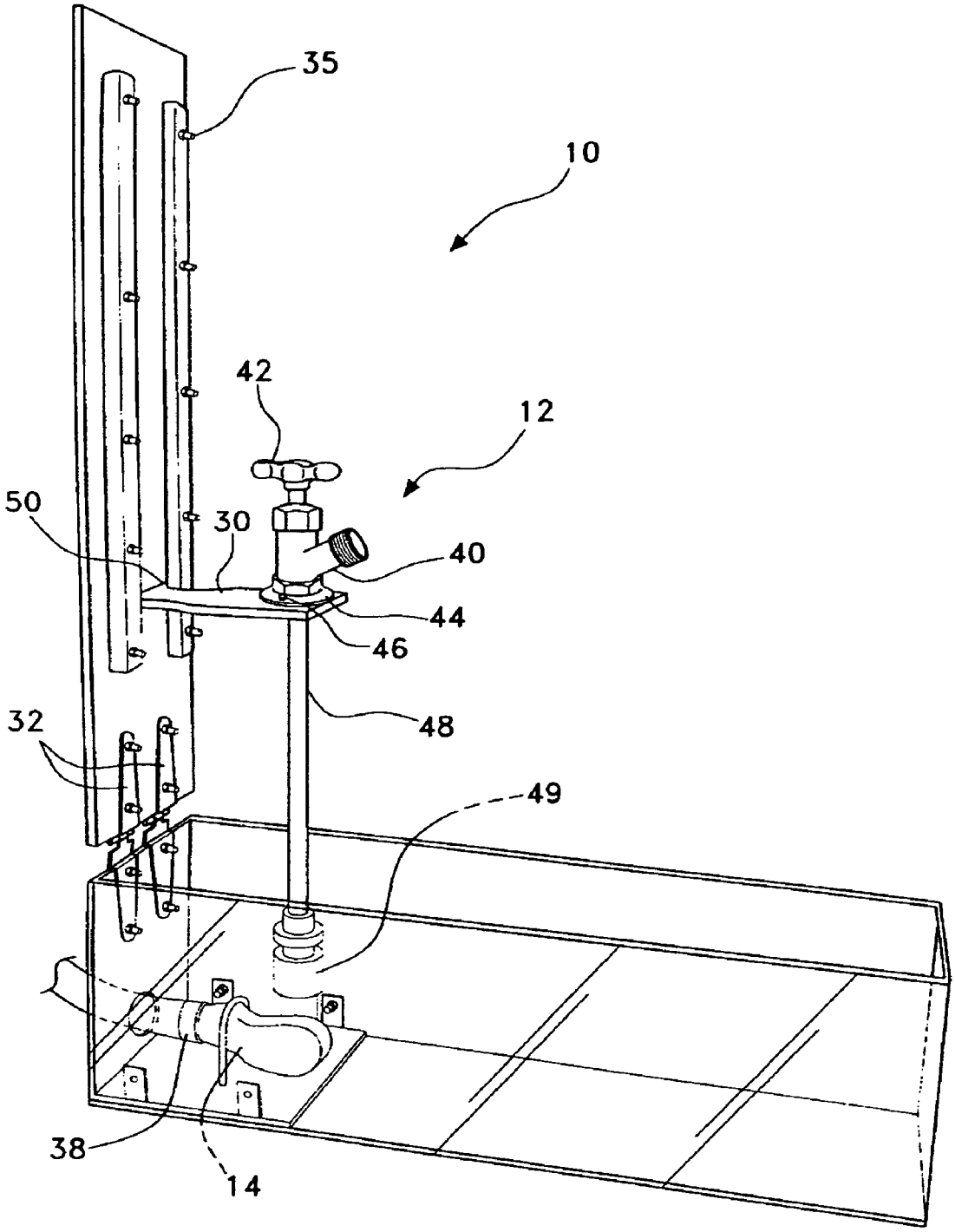
FIG. 2 is a perspective view similar to FIG. 1 with the inventive recessed water faucet in an upright, open position.
Figure 3:
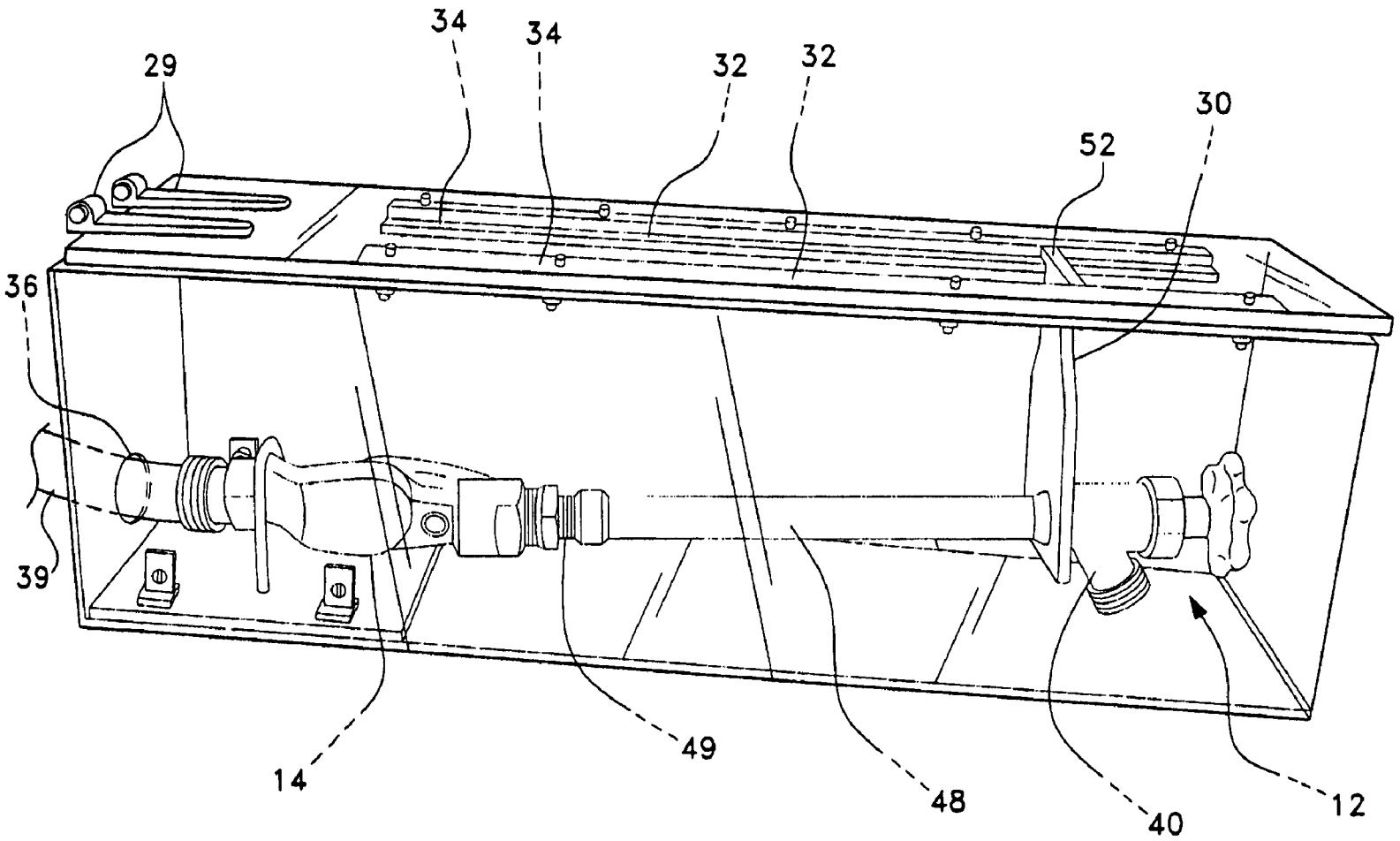
FIG. 3 is a perspective view similar to FIG. 1 with the inventive recessed water faucet in the closed, store position.

Referring to FIGS. 1-3 there is shown a clear-walled version of the present invention without provision for locking the outdoor frostproof water faucet in the vertical position for use to illustrate the mechanism for raising from a stored position to a vertical position for use and lowering to a stored position for winter months. This embodiment may be used with a propping rod or other device to hold the lid and faucet in the vertical, open position. Recessed water faucet system 10 includes a frostproof water faucet 12 attached to plumbing swivel 16 for allowing the raising of faucet 12 from the stored position (see FIG. 3) to the operative position (see FIG. 2). Faucet 12 and plumbing swivel 14 are mounted within faucet recessed box 16. Faucet recessed box 16 has opposing sidewalls having upper edges 19, front wall 20, rear wall 22, and bottom wall 24. Plumbing swivel 14 is held in place to the bottom wall 24 by a "U" shaped clamp 15 in a conventional manner. Box 12 has a lid 28 mounted at a rear end thereof to the rear end wall 22 for rotation between a horizontal closed position to a vertical open position by means of hinges 29.

Slider guides 32 are mounted parallel along the inner side of lid 28 by means of fasteners 35, the slider guides 32 forming opposed slider guide groves 34. A slider connector 30 (see FIG. 4) is a generally planar member defining an aperture 31 of such size as to fit over the stem portion of the frostproof valve 12. Rear wall 22 defines a plumbing entrance aperture 36 near the bottom wall 24 and aligned for connection of plumbing swivel inlet connector 38 with an inlet pipe 39 outside the recess box 16, inlet pipe 39 preferably being buried in the ground to avoid freezing. Recess box 16 is preferably buried in the ground up to the lid 28.

Frostproof valve 12 has a threaded water outlet 40 and a handle 42 for opening and closing the valve and is mounted to slider 30 at flange 44 by means of screw 46. Frostproof valve 12 is of conventional construction having a hollow stem 48 with a stem rod (not shown) attached to valve handle 42 at one end and to a valve (not shown) near plumbing swivel connection 49 such that turning the valve handle 42 remotely opens and closes the valve to flow of water from swivel 14, through stem 48 and out threaded water outlet 40. Such frostproof valves are commonly installed through the wall of a heated dwelling to avoid freezing of the supply pipe during the winter while allowing use for exterior watering when desired. The plumbing swivel 14 is of conventional construction. It is noted that, although the stem 48 retains water after valve shutoff when in the vertical position for convenient use as in FIG. 1, that water will drain out when the valve is stored as in FIG. 3 during the winter months.

Figure 4:
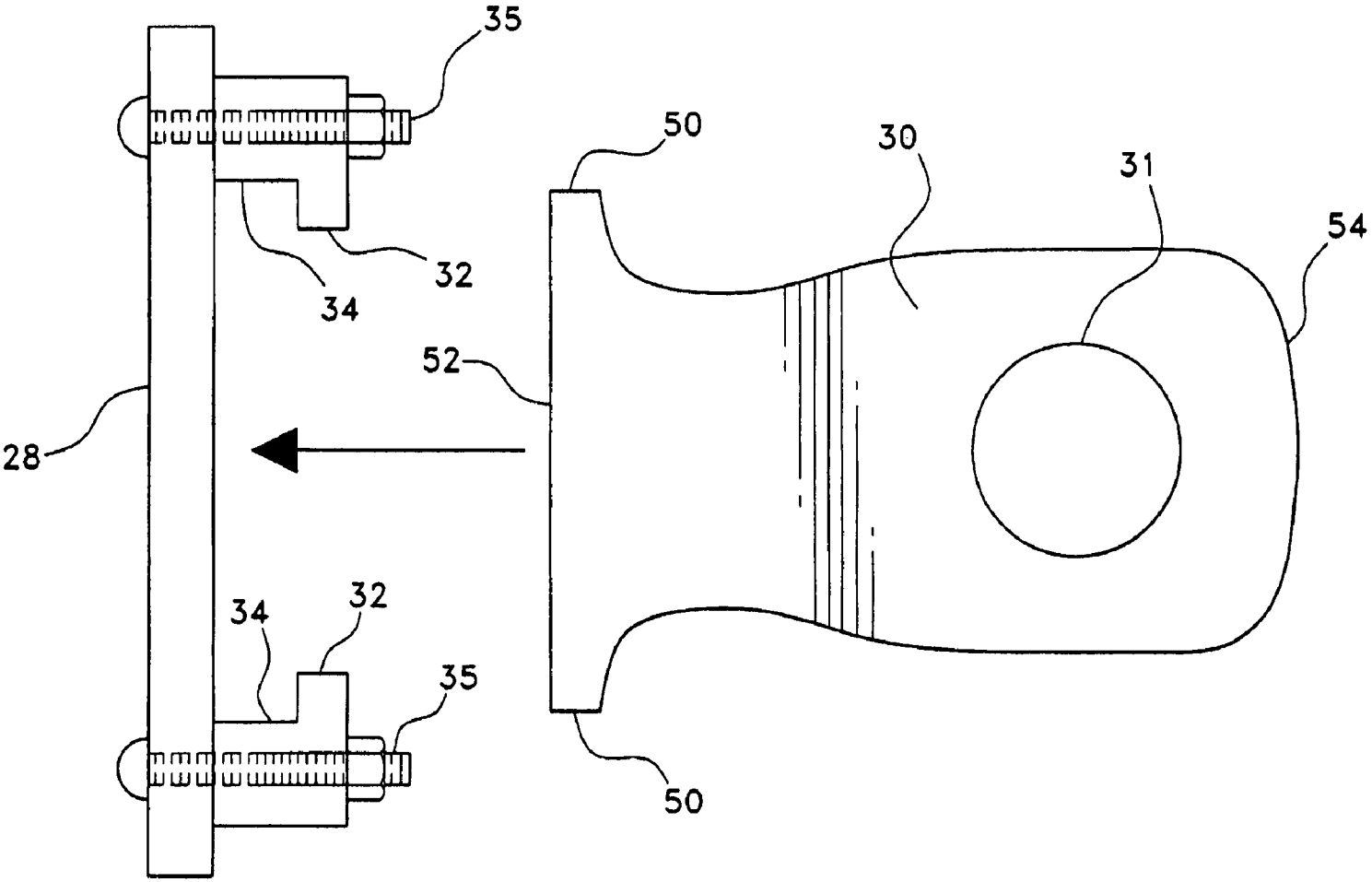
FIG. 4 is a detail exploded plan view of the slider connector and lid and slider guides of FIG. 1.

Referring to FIG. 4, slider connector 30 has a fixed end 54 having valve receiving aperture 31 and a slide end 52 having outwardly extending tongues 50 at slide end 52 which slidingly engage slider guide grooves 34 such that slider connector 30 is free to slide along the inner surface of lid 28 while being fixedly connected to the valve 12 at flange 44. The frostproof valve is thus movable from the stored position of FIG. 3 by grasping the front end of lid 28 and rotating it upward as in shown in an intermediate position in FIG. 1 to a vertical position as in FIG. 2. It is thus recognized that slider connector 30 connects faucet 12 to lid 28 with respective fixed and sliding connections. As a result, the slider connector is located near the front end of lid 28 when the system is in a closed, stored position, and near the hinged end of lid 28 when in the open position for use by the gardener.

Referring to FIGS. 5-10, there are shown views illustrating the locking hinge feature of another embodiment of the present invention wherein a sliding hinge arrangement renders the lid and connected valve self-locking in the vertical position while allowing ease in closing the lid to the stored horizontal position by the user. Locking lid system 60 includes a lid rear portion 62 having a depending sliding grooved hinge 64 at each side thereof (see FIGS. 5 and 6). Hinges 64 define elongated grooves 66, having a front end 65 and a rear end 67. The grooves extend parallel to lid rear portion 62 and rotate around binge pin hinge end portions 68 of hinge pin 69. Rear upper wall 70 is integral with lid rear portion 62 and perpendicular thereto so as to rotate around hinge end portions 68 with hinges 64.

Upper rear wall 70 is cut horizontally from the lower remainder of rear wall 74 forming an upper wall lower edge 72 and an upper edge 76 of wall 74. The cut is preferably done at a 45 degree angle sloping downward and inward to allow upper portion 70 to easily separate and swing away from wall 74. The cut is illustrated as forming a gap between the edges 72 and 76 for illustration purposes, however, the invention may be constructed without a gap with edges 72 and 76 being in contact in the closed position as desired.

Upon rotation of lid 28 around hinge pin 69 (see FIG. 7) the faucet system is rotated to the open position. When the vertical orientation is reached (see FIGS. 5 and 8) the lid rear portion 62 is free to slide down, locking against the inner side of rear wall 74. This occurs as the hinges 64 slide on hinge end portions 68 from the rear ends 67 of grooves 66 to the front ends 65, thereof. The spacing of the depending hinges 64 from the rear upper wall 70 is about equal to the thickness of the upper wall at the hinge to allow for the descent of the lid. To return the lid and connected frostproof faucet to the stored position, the user pulls upward on the lid until the hinge rear end 67 is against the hinge 69, freeing the lid to rotate to the closed position.

Figure 5:
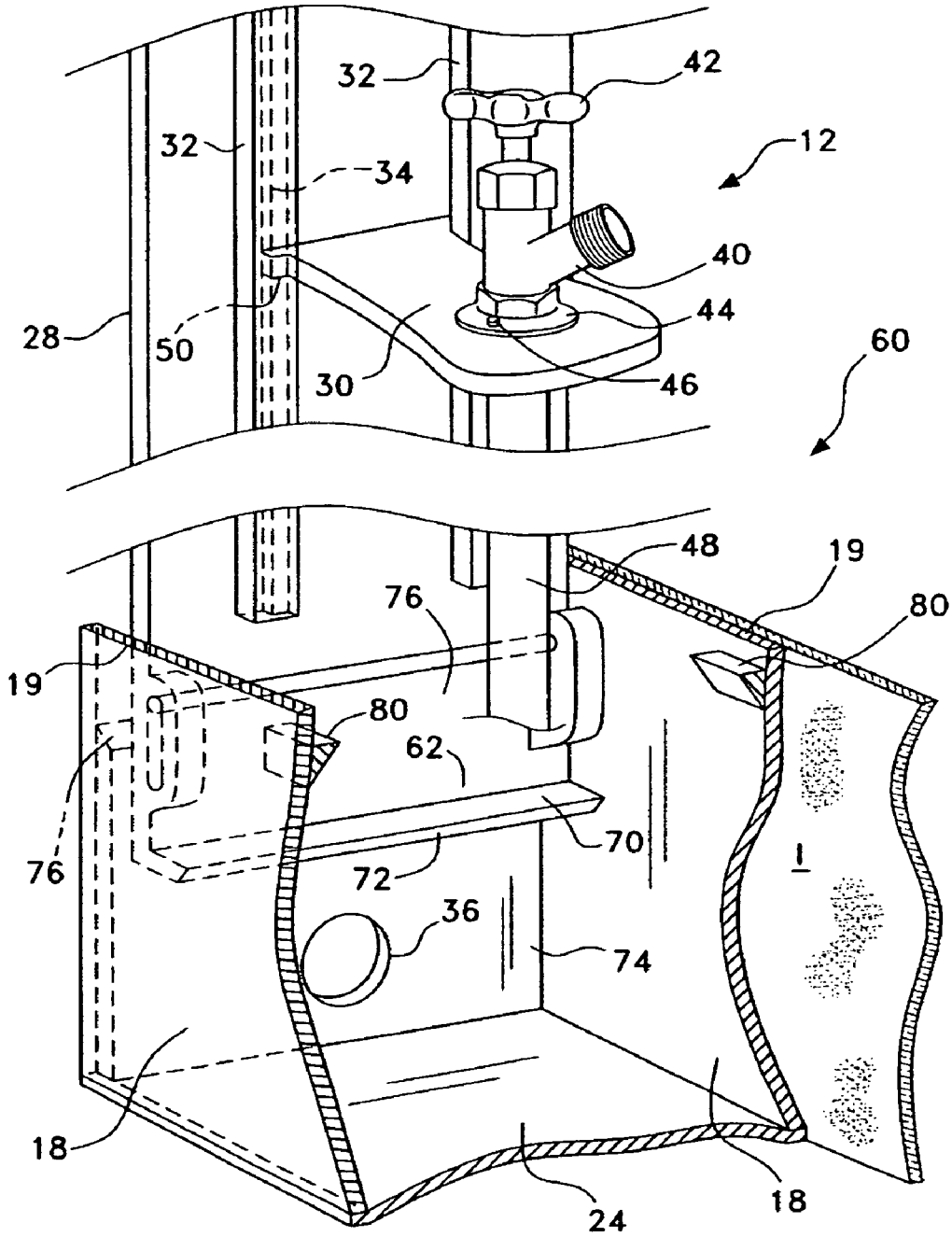
FIG. 5 is a perspective, broken away view of another embodiment of the invention similar to that of FIG. 1 having a self-locking lid.
Figure 6:
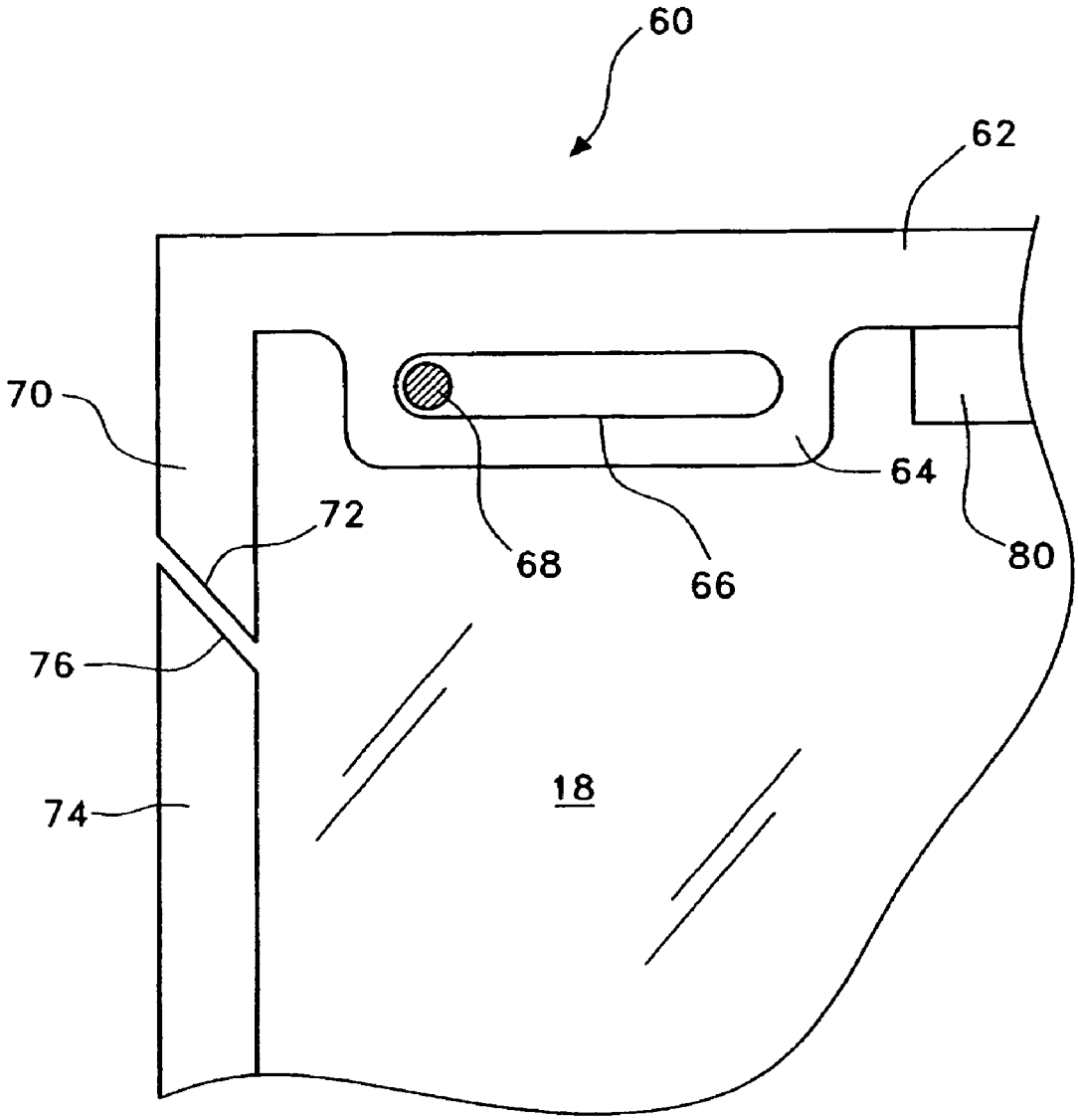
FIG. 6 is a diagrammatic side elevation view of the self-locking mechanism of FIG. 5 with the lid in the closed position.
Figure 7:
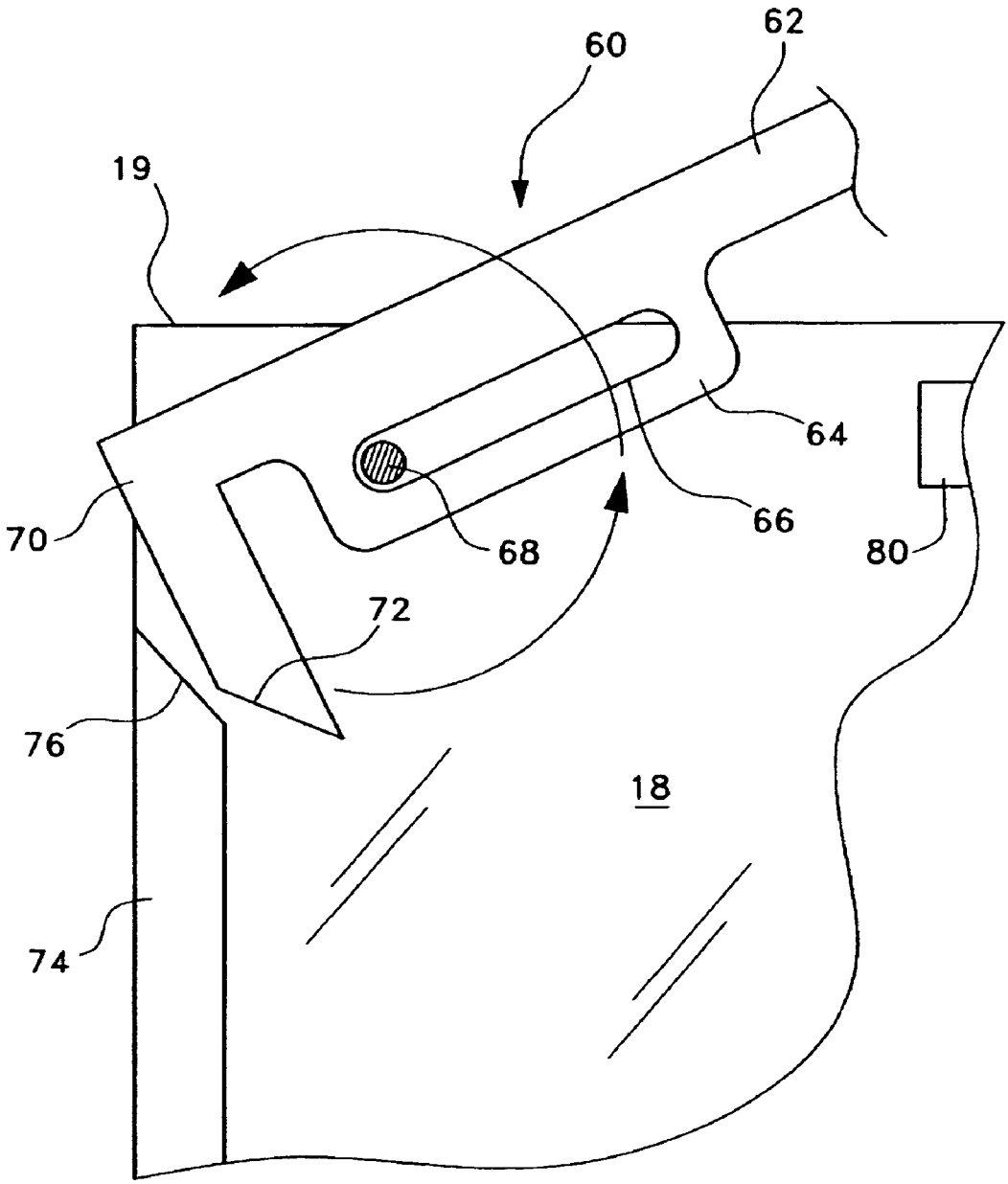
FIG. 7 is a diagrammatic view similar to that of FIG. 6 with the lid in the partially open position.
Figure 8:
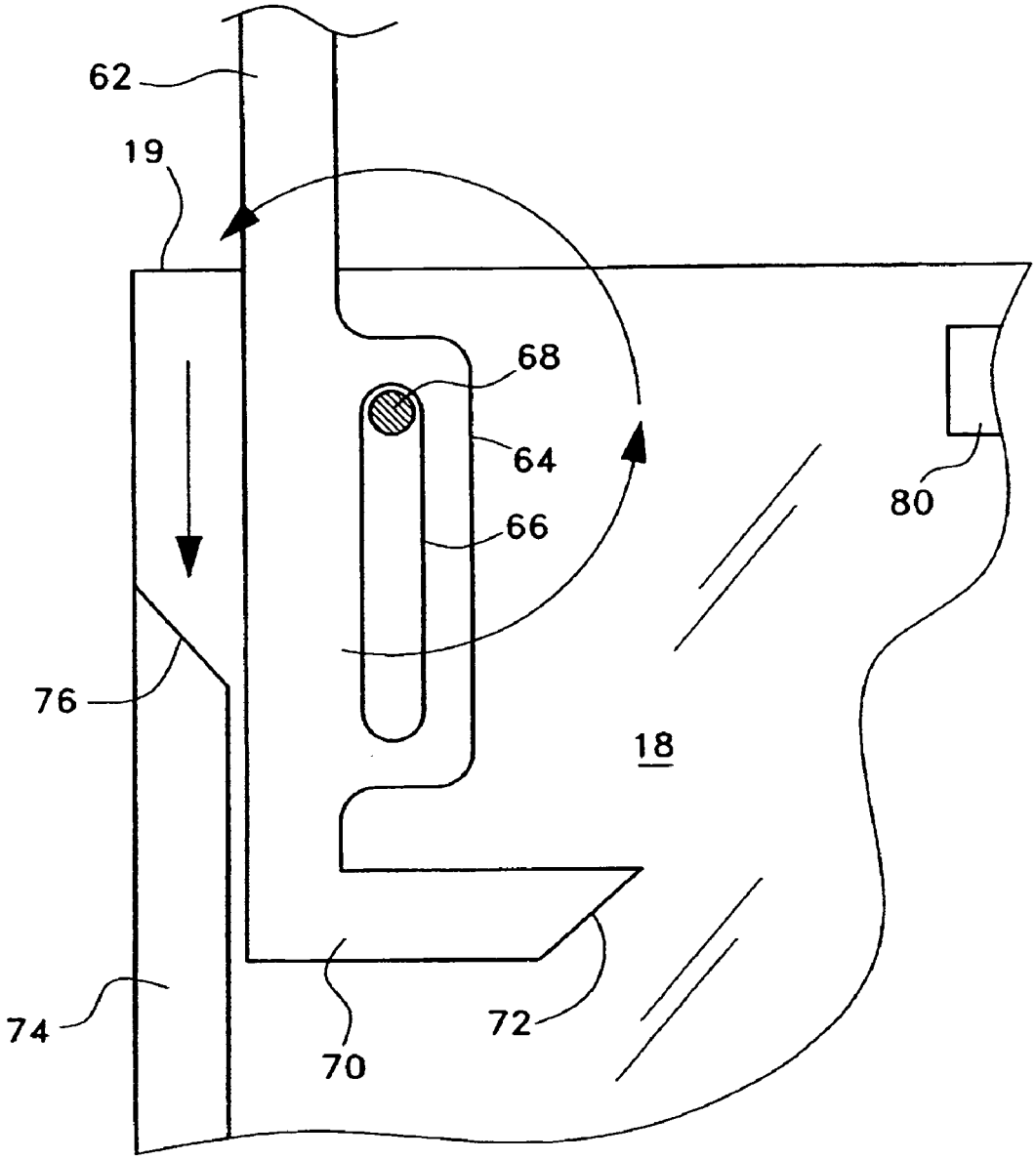
FIG. 8 is a diagrammatic view similar to that of FIG. 6 with the lid in the full open and locked position.
Figure 9:
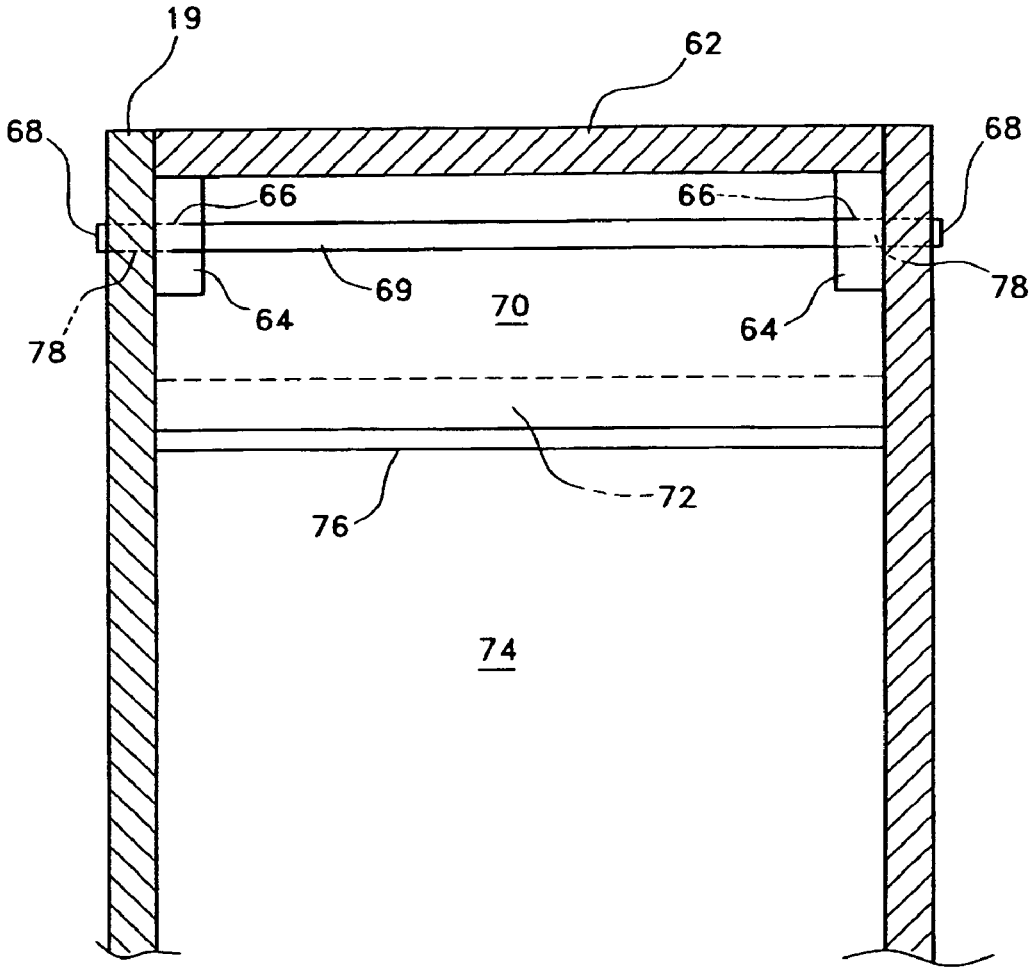
FIG. 9 is a sectional end elevation view of the embodiment of FIG. 5 taken near the locking mechanism of FIG. 5.
Figure 10:
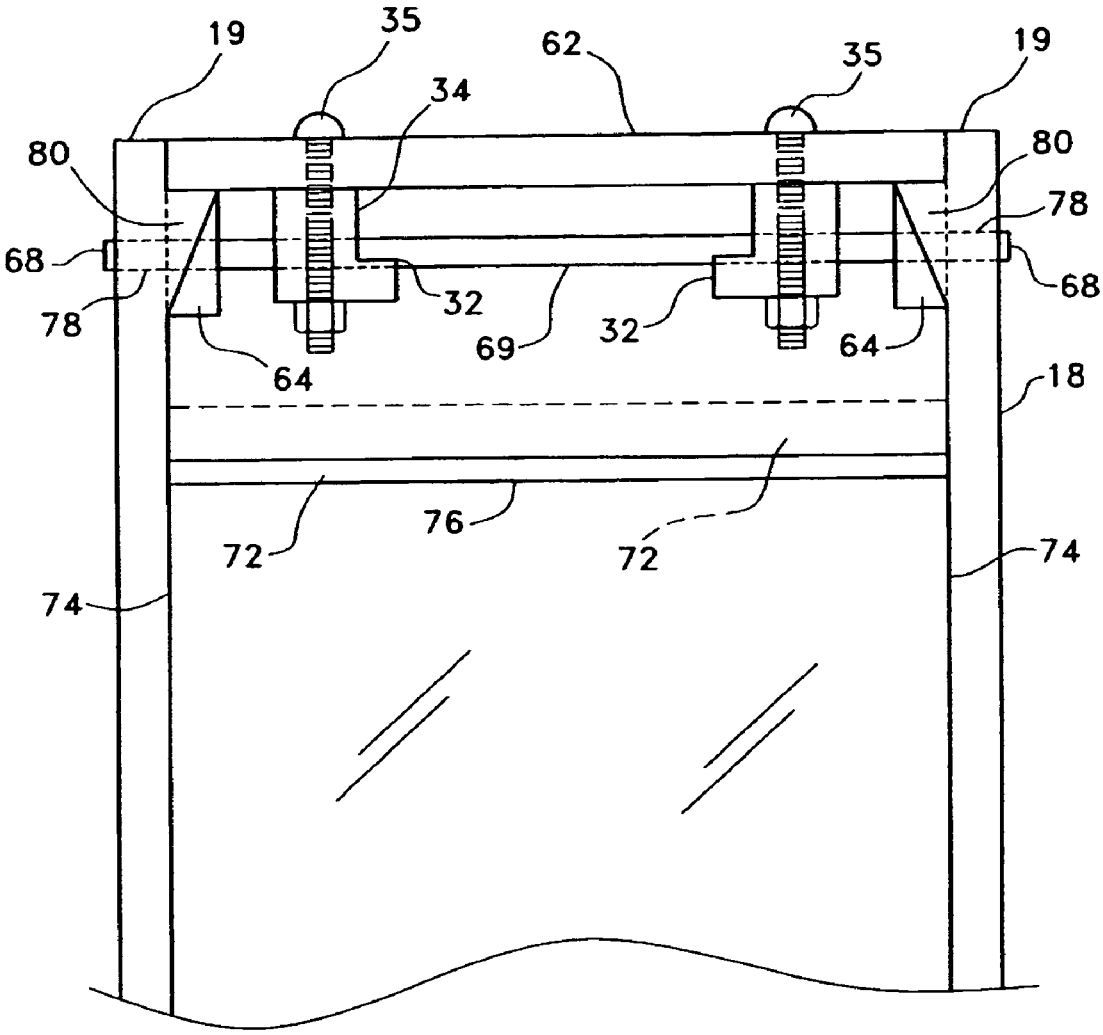
FIG. 10 is an end elevation view of the embodiment of FIG. 5 with the front wall removed.

As seen in FIGS. 5 and 9, lid portion 62 and hinges 64 are set within sidewalls 19, allowing for the rotation and vertical locking of lid 28 as described above. As seen in FIG. 10, the forward portion of lid 12 is supported by sidewall supports 80 extending inward from opposing sidewalls 18 attached therealong such as to support lid 28 in its horizontal closed position.

The housings, slider connector and slider groove guides of the present invention are preferably made of suitable opaque plastic. The frostproof faucet, plumbing swivel, and other plumbing fittings are of conventional construction and commercially available. For colder climates, insulation I may cover the sidewalls, bottom wall, and top wall as desired, FIG. 5 showing insulation I on sidewall 18. Insulation may also be placed on the interior walls of the unit (not shown) as desired in a similar manner.

It is to be understood that the present invention is not limited to the embodiments described above, but encompasses any and all embodiments within the scope of the following claims.

I claim:

1. A recessed water faucet system, comprising:

an elongated[, horizontally disposed] container having [opposing sidewalls, a bottom wall, a front wall, and a rear wall,] *a plurality of walls and an open top* said container having a lid covering said [container] *open top* and having a rear end *that is* hinged [at] *to* the [said rear wall and extending to a front end at said front wall] *container*, said container being openable [to a vertical position] by lifting said [front end of said] lid and rotating said lid around said hinged end from a [horizontal] closed position to [a vertical] *an* open position;

said system further comprising an frostproof water faucet having a faucet portion[, an elongated stem portion,] *that includes* a valve, and a plumbing pivot, said [valve] *faucet portion* being connected *to said container* with said plumbing pivot;

said plumbing pivot being mounted [along said bottom wall in the vicinity of said rear wall and] *to the container and having an opening that enables the pivot to be* connected to a water supply pipe;

[said rear wall having defining an aperture therethrough located to receive said water supply pipe;]

[means for rotating] *the plumbing pivot enabling* said frostproof water faucet *to rotate* from a stored [horizontal] position [extending along said elongated] to [a vertical] *an operating* position around said plumbing pivot;

[said means for rotating] said frostproof water faucet being attached [between said faucet portion and] *to* said lid;

[whereby, upon] *wherein an* opening and rotating *of* said lid of said container to [a vertical] *the open* position[,] *rotates* said frostproof water faucet [is rotated to a vertical] *about the plumbing pivot from the stored to the operating* position.

2. The recessed water faucet system of claim 1, [said means for rotating said frostproof water faucet attached between said faucet portion and said lid comprises] *wherein* a [slider connector fixably mounted to] *sliding connection connects* said faucet portion and slidingly connected with said lid.

3. The recessed water faucet system of claim 2, *wherein* said [means for rotating said frostproof water faucet further] *sliding connection* comprises a pair of parallel slider guides mounted to the underside of said lid.

4. The recessed water faucet system of claim 3, *wherein* said pair of parallel slider guides [defining] *defines* opposing grooves extending the substantial length thereof, said [slider connector] *sliding connection* having opposing tongues [so] configured [as] to slidingly fit within said opposed grooves; whereby said [slider connector] *tongues* slide[s] within said opposed grooves [of said slider guides] from the front portion of said lid to the rear portion of said lid upon lifting and rotating said lid to [a vertical] *an open* position, thereby rotating said frostproof water faucet from the stored [horizontal] position to [a vertical] *the operating* position for use.

5. The recessed water faucet system of claim 4, wherein said [slider connector] *sliding connection* is elongated in shape having a sliding end and a fixed end, said tongues extending from said sliding end, said fixed end defining an aperture fixedly receiving said faucet neck portion at said faucet portion.

6. The recessed water faucet system of claim 5, wherein said faucet portion has a mounting flange affixed to said slider connector by fasteners such as screws.

7. The recessed water faucet system of claim 6, further comprising means for locking said lid [and said frostproof water faucet] in the [vertical] *operating* position for use and for unlocking said lid and said frostproof water faucet for storage in the [horizontal] *closed* position.

8. The recessed water faucet system of claim 7, wherein *the container has a rear wall and a plurality of sidewalls, wherein* said lid and said rear wall are each recessed between said sidewalls of said elongated[, horizontally disposed] container.

9. The recessed water faucet system of claim 8, wherein said means for locking and unlocking is a locking hinge system *positioned* at said rear wall comprising:

the rear portion of said lid and an upper portion of said rear wall integral with and perpendicular to said lid rear portion;

a hinge depending from each side of said rear portion of said lid and spaced from said rear wall upper portion;

each said hinge defining an elongated groove having a forward end and a rear end and extending parallel with said upper wall; and a hinge pin having hinge pin ends fixed in said respective opposing sidewalls of said elongated, horizontally disposed container in the vicinity of the upper rear corner, thereof;

said hinge pin extending through said groove of each said hinge;

said rear wall upper portion being separated from the remaining portion of said rear wall by a horizontal cut;

said hinge pin being located at the respective rear ends of said hinge grooves when said lid is in the closed position;

whereby, upon rotation of said lid from a horizontal position to a vertical position, said hinges rotate around said hinge pin at the rear end of said grooves, said upper rear wall portion separating from said remainder of said rear wall; and whereby, upon said lid reaching a vertical position, said lid and said hinges are free to descend the length of said grooves such that said rear end of said grooves rest upon said hinge pin, rear portion of said lid locking against the inner side of said remaining portion of the rear wall.

10. The recessed water faucet system of claim 9, wherein said depending hinges are spaced from said rear upper wall portion by a length about equal to the thickness of said upper lid at said groove so as to allow said lid to fit vertically between said hinge pin and the inner surface of said rear wall remaining portion.

11. The recessed water faucet system of claim 10, wherein said upper wall is unlocked from the vertical position by pulling upward thereon until said rear ends of said hinge grooves are against said hinge pin, allowing said lid to be rotated around said hinge pin to the horizontal, stored position, said frostproof water faucet rotating to the closed position therewith.

12. The recessed water faucet system of claim 11, wherein said horizontal cut in said rear wall is at about a 45 degree angle sloping downward and inward from the outer surface of said rear wall, allowing said upper portion to easily swing forward, away from the remainder of said rear wall.

13. The recessed water faucet system of claim 12, wherein said lid rests on supports extending inward from said opposing sidewall when in the closed position.

14. The recessed water faucet system of claim 1, wherein said elongated container is made of plastic material.

15. The recessed water faucet system of claim 1, further comprising an insulation layer on at least one of each of said rear wall, said front wall, said bottom wall, said lid and said opposing sidewalls.

16. The recessed water faucet system of claim 15, said insulation layer being located on the outer surface of its corresponding wall.

17. The recessed water faucet system of claim 16, said system being adapted for being set in the ground to at least the level of said lid when in the stored, horizontal position and said water supply pipe runs underground to protect from freezing.

*18. A frost proof faucet apparatus comprising:*

*a) a housing having an upper portion that provides an opening;*

*b) a lid attached to the housing and rotatable relative to the housing between open and closed positions, the closed position covering the opening;*

*c) a faucet;*

*d) a fitting attached to the housing, the fitting providing a water flow inlet that is connectable to a water source;*

*e) a flowline that connects the fitting to the faucet; and*

*f) the faucet being connected to and supported by the lid so that the faucet extends below the lid and is contained in the housing interior when the lid is closed, the faucet being supported in an operating position when the lid is in the open position;*

*g) a holder for holding the lid in the open position.*

*19. The frost proof faucet of claim 18 wherein the holder includes a slider that extends between the faucet and the lid.*

*20. The frost proof faucet of claim 19 wherein the slider is a member that is slideably affixed to the lid.*

*21. The frost proof faucet of claim 18 wherein the lid has upper and lower surfaces and the faucet attaches to the lower surface of the lid.*

*22. The frost proof faucet of claim 19 wherein the lid has upper and lower surfaces and the slider attaches the faucet to the lower surface of the lid.*

*23. The frost proof faucet of claim 18 wherein the lid has a track and the slider slides upon the track between first and second positions.*

*24. The frost proof faucet of claim 23 wherein the first position is closer to the hinge than the second position.*

*25. The frost proof faucet of claim 18 wherein the holder comprises interlocking members mounted respectively on the lid and on the housing.*

*26. The frost proof faucet of claim 18 wherein the holder comprises in part the hinge and slots on the lid wherein the hinge slides in the slots.*

*27. The frost proof faucet of claim 18 wherein the housing has end portions, and upper portion and a lower portion, wherein the hinge is mounted on one end portion of the housing near the upper portion of the housing and the holder comprises in part the hinge and slots on the lid wherein the hinge slides in the slots.*

*28. The frost proof faucet of claim 25 wherein the housing has a wall that in part supports the lid in the open position.*

*29. The frost proof faucet of claim 26 wherein the housing has a wall that in part supports the lid in the open position.*

*30. The frost proof faucet of claim 27 wherein the housing has a wall that in part supports the lid in the open position.*

*31. The frost proof faucet of claim 23 wherein the faucet slides from the first to the second position when the lid is moved to the closed position.*

*32. The frost proof faucet of claim 23 wherein the faucet slides from the second to the first position when the lid is moved to the open position.*

*33. A frost proof faucet apparatus comprising:*

*a) a housing having an upper portion that provides an opening;*

*b) a lid attached to the housing and rotatable relative to the housing between open and closed positions, the closed position covering the opening;*

*c) a faucet;*

*d) a fitting attached to the housing, the fitting providing a water flow inlet that is connectable to a water source;*

*e) a flowline that connects the fitting to the faucet; and*

*f) the lid having a lower surface, wherein a member is attached to and extends downwardly from the lower surface of the lid to the faucet, the member holding the faucet in a position that places the faucet within the housing interior when the lid is closed and in an operating position when the lid is in the open position.*

*34. The frost proof faucet of claim 33 wherein the holder includes a slider that extends between the faucet and the lid.*

*35. The frost proof faucet of claim 33 wherein the slider is a member that is slideably affixed to the lid.*

*36. The frost proof faucet of claim 33 wherein the lid has upper and lower surfaces and the faucet attaches to the lower surface of the lid.*

*37. The frost proof faucet of claim 33 wherein the lid has upper and lower surfaces and the slider attaches the faucet to the lower surface of the lid.*

*38. The frost proof faucet of claim 33 wherein the lid has a track and the slider slides upon the track between first and second positions.*

*39. The frost proof faucet of claim 33 wherein the first position is closer to the hinge than the second position.*

*40. The frost proof faucet of claim 33 wherein the holder comprises interlocking members mounted respectively on the lid and on the housing.*

*41. The frost proof faucet of claim 33 wherein the holder comprises in part the hinge and slots on the lid wherein the hinge slides in the slots.*

*42. The frost proof faucet of claim 33 wherein the housing has end portions, and upper portion and a lower portion, wherein the hinge is mounted on one end portion of the housing near the upper portion of the housing and the holder comprises in part the hinge and slots on the lid wherein the hinge slides in the slots.*

*43. The frost proof faucet of claim 33 wherein the housing has a wall that in part supports the lid in the open position.*

*44. The frost proof faucet of claim 33 wherein the housing has a wall that in part supports the lid in the open position.*

*45. The frost proof faucet of claim 33 wherein the housing has a wall that in part supports the lid in the open position.*

*46. The frost proof faucet of claim 33 wherein the faucet slides from the first to the second position when the lid is moved to the closed position.*

*47. The frost proof faucet of claim 33 wherein the faucet slides from the second to the first position when the lid is moved to the open position.*

* * * * *